United States Patent [19]
Stoeckl et al.

[11] Patent Number: 5,430,714
[45] Date of Patent: Jul. 4, 1995

[54] METHOD FOR ALLOCATING THE SWITCHING-ORIENTED RESOURCES OF A COMMUNICATION SYSTEM FOR SWITCHED CONNECTIONS AND PERMANENT CIRCUIT CONNECTIONS

[75] Inventors: Werner Stoeckl, Baierbrunn; Michael Tietsch, Kaufering, both of Germany

[73] Assignee: Siemens Aktiengesellschaft, Munich, Germany

[21] Appl. No.: 89,333

[22] Filed: Jul. 12, 1993

[30] Foreign Application Priority Data

Jul. 28, 1992 [DE] Germany .................. 42 24 932.5

[51] Int. Cl.⁶ .................. H04L 12/52; H04L 12/58
[52] U.S. Cl. .................. 370/54; 370/58.1; 370/60.1
[58] Field of Search .......... 370/54, 58.1, 58.2, 370/58.3, 60, 60.1, 94.1, 94.2, 110.1; 340/825.03, 826, 827

[56] References Cited

U.S. PATENT DOCUMENTS

| | | | |
|---|---|---|---|
| 4,805,166 | 2/1989 | Ardon | 370/54 |
| 4,811,333 | 3/1989 | Rees | 370/58.1 |
| 4,903,260 | 2/1990 | Boettle et al. | 370/60 |
| 5,065,392 | 11/1991 | Sibbitt et al. | 370/58.2 |
| 5,255,266 | 10/1993 | Watanabe et al. | 370/60.1 |

OTHER PUBLICATIONS

"B-ISDN User-Network Interface Layer 3 Specification for Basic Call/Bearer Control", CCITT Recommendation Q93B, draft, Oct. 1991, 84 pages.

*Primary Examiner*—Wellington Chin
*Attorney, Agent, or Firm*—Hill, Steadman & Simpson

[57] ABSTRACT

Method for allocating the switching-oriented resources of a communication system for switched connections and permanent circuit connections. Call duration information (vdi) is formed in the communication terminal equipment connected to a communication system for switched connections (W) whose call durations can be determined. This call duration information (vdi) is communicated to the communication system within the framework of the call setup. In the communication system, the ending times of the switched calls are calculated after the through-connection of the switched connections (W) and those switched connections (W) are selected whose indicated call durations end lying closest to the switching deadline before the following switching deadline of a deadline permanent circuit connection (FW). Dependent on the scopes of the switching-oriented resources (WR) allocated to the selected switched [or: dialed] connections (W) and on the scopes of the switching-oriented resources (VR) required for the deadline permanent circuit connections (FV), switched connections (W) are selected from these. Their switching-oriented resources (VR) that become free are then reserved for the respectively provided, deadline permanent circuit connection (FV).

20 Claims, 3 Drawing Sheets

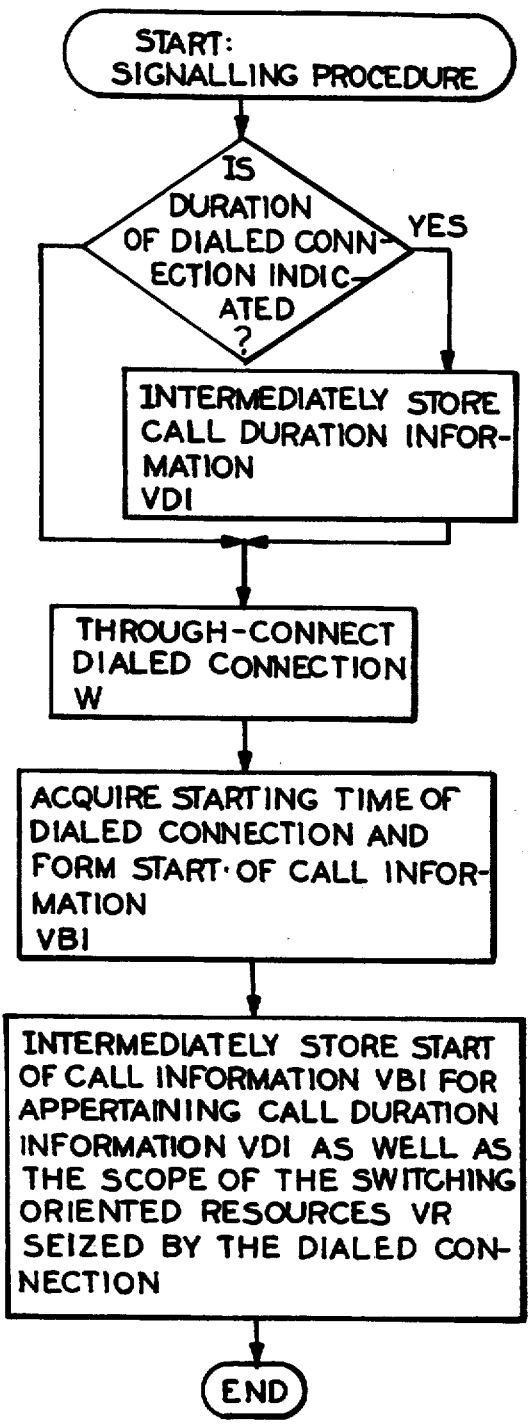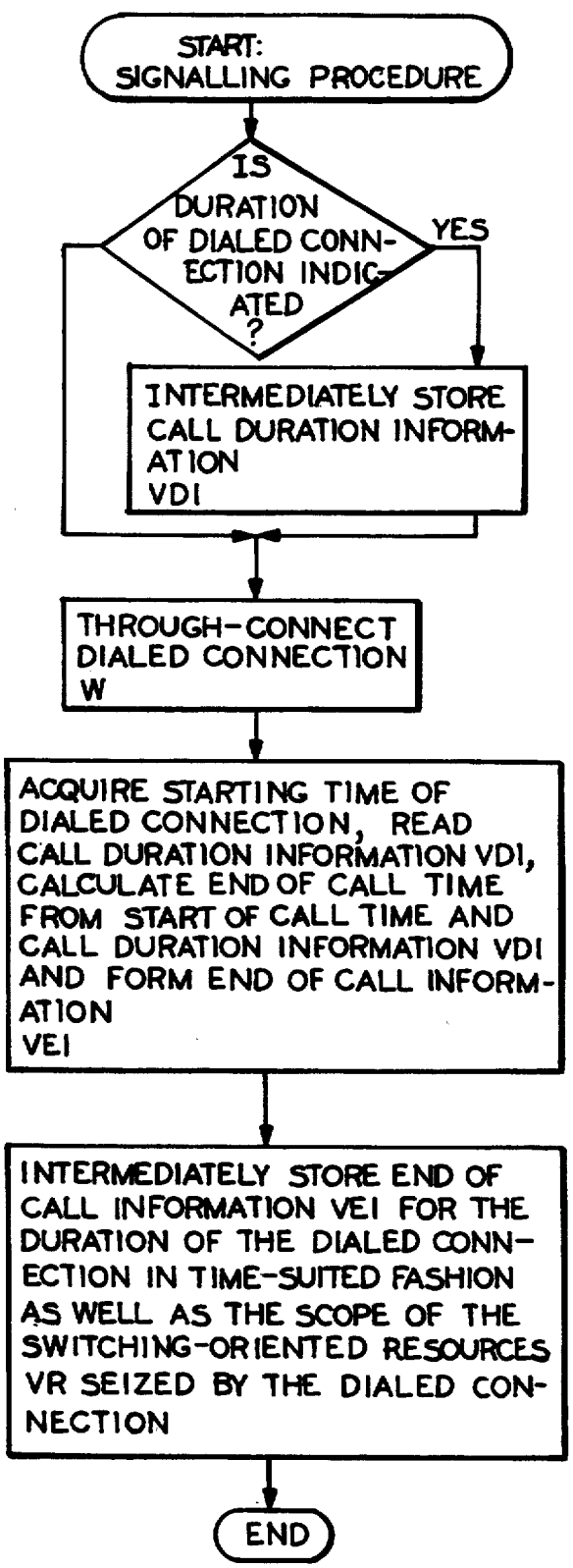

METHOD FOR ALLOCATING THE SWITCHING-ORIENTED RESOURCES OF A COMMUNICATION SYSTEM FOR SWITCHED CONNECTIONS AND PERMANENT CIRCUIT CONNECTIONS

BACKGROUND OF THE INVENTION

In communication systems, switching-oriented (call processing) resources represent those switching-oriented operating means that are temporarily provided for switched connections (such as dialed connections) and may be potentially provided over long time spans for permanent circuit connections for the switching of the connections of communication terminal equipment. Switching-oriented resources particularly encompass the central switching equipment and sub (decentralized) switching equipment of communication systems and, to an increasing degree, the transmission capacities of communication terminal equipment terminals of communication systems, particularly broad band communication systems. The transmission capacities or transmission sub-capacities can be switched or allocated to one or more communication terminal equipment connectable to a communication terminal equipment terminal. The allocation or switching of the switching-oriented resources in switched connections accomplished by a signalling procedure provided between the communication terminal equipment and the communication system. It is accomplished in permanent circuit connections either on the basis of a signalling procedure between the communication terminal equipment and the communication system or by A&M-oriented inputs or settings at the communication system. By contrast to switched connections, the switching-oriented resources for permanent circuit connections are not to be available directly following the signalling phase but at times prescribed by the subscribers, i.e. prescribed day, hour and chronological duration. In order to assure the availability of the switching-oriented resources at the prescribed times, the switching-oriented resources are reserved within a reservation time before the prescribed time. The required duration of the reservation time is substantially defined by the scope of the required switching-oriented resources (i.e. by the required scope of the switching network capacity or transmission capacity). The required switching network capacity or transmission capacity is usually cited in dataset per time units, for example, 64 Kbit/s or 2 Mbit/s in an integrated services digital network (ISDN). Given an increasing scope of the required switching-oriented resources, this means longer reservation times, whereby reservation times, for example, in the range of hours, are to be provided given a high requirement for switching-oriented resources. A maximum traffic load of the communication system is also to be taken into consideration in the determination of the reservation times, since a traffic load due to switched connections and of the resource requirements connected therewith during a predetermined reservation time is not predictable. As a result the reservation time is additionally lengthened. Given a large requirement for resources, available sub-resources are reserved or collected during the reservation time (for example, individual 64 Kbit/s capacities given a requirement of 2 Mbit/s) until the required scope of the resources is reserved. The reserved switching-oriented resources remain unused within these reservation times, particularly for switched connections. This reduces the overall switching capacity or transmission capacity of a communication system to a considerable extent given extensive switching-oriented resources to be reserved and given a plurality of permanent circuit connections to be reserved simultaneously.

SUMMARY OF THE INVENTION

It is an object of the present invention to limit the unavailable, switching-oriented resources reserved in a communication system before a switching of deadline permanent circuit connections. This object is achieved by a method for allocating switching-oriented resources in a communication system wherein deadline permanent circuit connections and switched connections can be switched by the switching-oriented resources between communication terminal equipment connected to the communication system. Call duration information is formed in the respective communication terminal equipment given switched connections whose call durations can be determined. This call duration information is communicated to the communication system within the framework of the call setup.

Those switched connections whose determined call durations end closest to the switching deadline before the following switching deadlines of the deadline permanent circuit connections are selected in the communication system beginning with reservation points in time for deadline permanent circuit connections dependent on the scopes of the switching-oriented resources provided for the deadline permanent circuit connections and on the traffic load of the communication system. Switched connections are selected therefrom dependent on the scopes of the switching-oriented resources allocated to the selected switched connections and on the scope of the switching-oriented resources required for the permanent circuit connection. The switching-oriented resources of the selected switched connections that become free after the end of the call are reserved for the respectively provided, deadline permanent circuit connections.

An important aspect of the method of the present invention is that call duration information is formed in communication terminal equipment wherein call duration can be indicated, is communicated to the allocated communication system and, after the through-connection of the respective switched connection, the end of call time and the release time of the allocated, switching-oriented resources connected therewith can be calculated. Further, the ends of call lying closest before the deadline for the following, deadline permanent circuit connection are selected in the communication system and the switching-oriented resources of the appertaining switch connections are identified until the sum of the identified, switching-oriented resources corresponds to the scope of the deadline permanent circuit connection to be respectively switched. The switching-oriented resources of the switched connections selected in this way are respectively reserved at the end of the switched connection for the respective deadline permanent circuit connection.

An important advantage of the method of the present invention is that a simple measure (communicating determinable call durations to the communication system) makes it unnecessary for the switching-oriented resources of a communication system that are provided for a deadline permanent circuit connection to be already reserved beginning with a reservation time that is essentially adapted to the scope of the switching-oriented resources of the permanent circuit connection. Rather, these can be used for switched connections provided with call duration particulars until shortly before the deadline of the permanent circuit connection. As a result thereof, a significant enhancement is achieved in the utilization of the switching-oriented resources in a communication system. Preferably suitable as switched connections having determinable call durations are switched connections for data transmissions, for example file transfers, form transmissions, etc.

In small and medium-sized communication systems, the sum of the switching-oriented resources of the selected switched connections provided with call durations may remain under the scope of the switching-oriented resources that are required for the following, deadline permanent circuit connection. According to an advantageous development of the method of the present invention, the sum of the switching-oriented resources of the selectable switched connections provided with call durations is thereby calculated beginning with a reservation time that is declared for the reservation of switching-oriented resources of switched connections without indicated call durations that become free and the additionally required scope of switching-oriented resources is reserved by switching-oriented resources of switched connections without indicated call durations that become free. As a result of this advantageous measure, i.e. a combination of the previous reservation method with the method of the present invention, the method of the present invention can be utilized in all communication systems for reserving switching-oriented resources for deadline permanent circuit connections. Further, the point in time of reservation for the reservation of switching-oriented resources of switched connections with or without indicated call durations can be determined dependent on the plurality of switched connections having indicated call durations and/or dependent on the sum of the switching-oriented resources of these switched connections. The plurality of switched connections having indicated call durations is thereby constantly identified and the current reservation point in time is defined in accord with a prescribed plurality that is defined dependent on the deadline permanent circuit connection having the greatest scope of switching-oriented resources.

Further, respective versions that are especially advantageous, particularly in view of a program-oriented realization, are as follows. In one version, the communicated call duration information is intermediately stored in the communication system. After the through-connection of the appertaining switched connections, their start of call times are calculated and a start of call information is formed and is also stored with the appertaining call duration information. Beginning with a reservation point in time provided for the respective permanent circuit connection, the call duration information, as well as, the start of call information is read, the respective end of call time is identified and a corresponding end of call information is formed and is stored in chronological sequence. By means of the stored end of call information, the switched connection lying closest before the deadline of the deadline permanent circuit connection and the scope of the switching-oriented resources allocated thereto are identified. Given an inadequate scope of the switching-oriented resources of the selected switched connection for the deadline permanent circuit connection to be respectively switched, the following switched connection lying next closest to the switching deadline is respectively selected until the sum of the switching-oriented resources of the selected switched connections corresponds to the required scope of the switching-oriented resources of the deadline permanent circuit connection. Reservation information is formed and stored for the purpose of reserving the switching-oriented resources of the selected switched connections that become free.

In another version the communicated call duration information is also intermediately stored in the communication system. However, the switched connection lying closest before the switching deadline of the respective, deadline permanent circuit connection is selected and the scope of the switching-oriented resources allocated thereto is identified beginning with a reservation point in time provided for the respective, deadline permanent circuit connection and with the assistance of the stored end of call information. Given an inadequate scope of the switching-oriented resources of the selected switched connection for the deadline permanent circuit connection to be respectively switched, the following switched connection lying closest to the switching deadline is respectively selected until the sum of the switching-oriented resources of the selected connections respectively corresponds to the required scope of the switching-oriented resources of the deadline permanent circuit connection. Reservation information is formed and stored for the purpose of reserving the switching-oriented resources of the selected switched connections that become free.

An important difference between the two versions is that the call duration information indicating the call duration, as well as, call beginning information indicating the beginning of the call are stored in the first version and an end of call information is formed from the intermediately stored call duration information and the calculated call beginning in the second version and is stored. The additional outlay of identifying, forming and storing an end of call information for every switched connection having an indicated call duration seems advantageous when deadline permanent circuit connections are to be frequently switched in the communication systems.

According to another advantageous development of the method of the present invention, switching-oriented resources represent the switching capacity of a communication system and/or the respective transmission capacity of a base terminal (or basic access) of a broadband integrated services digital network. The base terminal of a broadband integrated services digital network has, for example, a switching-oriented resource, i.e. a communication capacity of 150 or 600 Mbit/s. The switching-oriented resource can be subdivided or switched into, for example, individual sub-resources covering 2 Mbit/s or 64 Kbit/s. In order to offer a deadline permanent circuit connection having a scope of switching-oriented resources of 1 Mbit/s at the indicted deadline, for example for the purpose of a video conference, individual switching-oriented sub-resources covering 64 Kbit/s can be reserved by means of the method of the present invention.

Particularly advantageously, the call duration information formed in the communication terminal equipment is communicated to the communication system in a duration information field provided for this purpose in a call setup message of the broadband, integrated services digital network. This call duration information field, for example, can be provided for the currently standardized signalling procedure Q.93B (B-ISDN access signalling) for broadband, integrated services digital networks.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIGS. 2A, 2B and 3 are flowcharts depicting two versions of a program-oriented realization of the method of the present invention.

DESCRIPTION OF THE PREFERRED EMBODIMENT

Figure 1A:
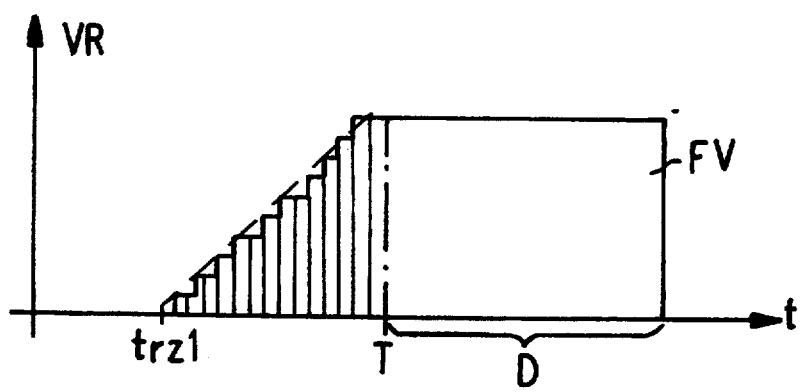
FIGS. 1A–1C are three time/resource diagrams that influence the method of the present invention on the reservation points in time, as well as, on the reservation of the switching-oriented resources of deadline permanent circuit connections.
Figure 1B:
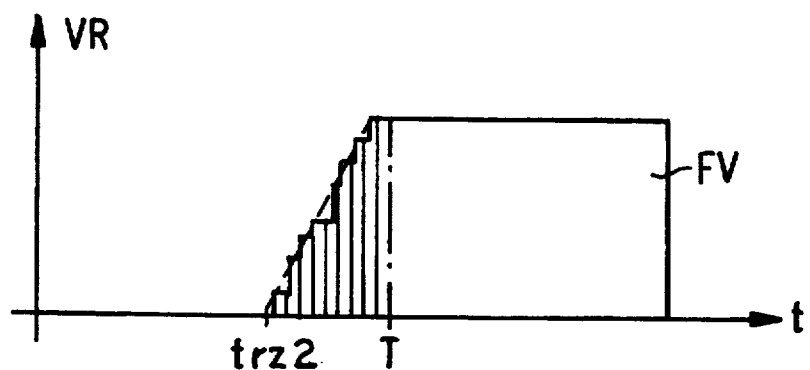
Figure 1C:
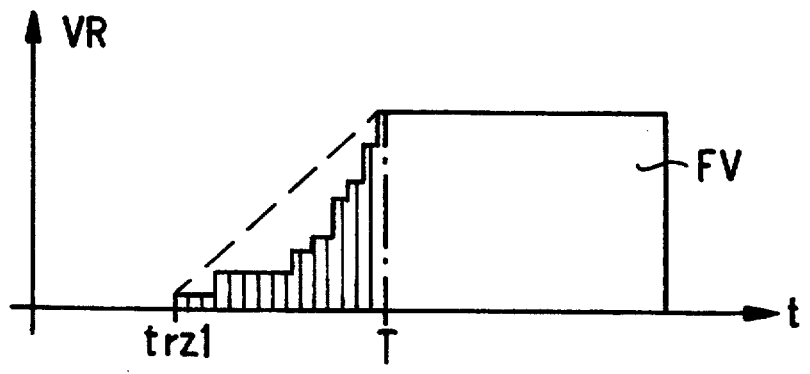

In a time/resource diagram, FIG. 1A shows a reservation method for a deadline permanent circuit connection FV, whereby time T is allocated to the abscissa axis and the scope of the switching-oriented resources VR is indicated by the ordinate axis. This allocation, as well as, a deadline T for a deadline permanent circuit connection FV and the duration D thereof is also shown in FIGS. 1A–1C. The deadline T for the permanent circuit connection FV, for example, is defined by a A&M-oriented input at an operating facility of a communication system. Alternatively, this deadline T can be set by a signalling from communication terminal equipment connected to the communication system that is provided early before this deadline T. The switching-oriented resources VR, for example, represent the transmission capacity of a base terminal (or basic access) of a broadband, integrated services digital network (referred to as B-ISDN in the technical field), whereby switching capacities of the base terminal of 150 Mbit/s or, respectively, 600 Mbit/s are possible.

FIGS. 1A–1C also indicate a first reservation point in time trz1. This reservation point in time trz1 is essentially influenced by the scope of the switching-oriented resources VR for the deadline permanent circuit connection FV that is to be switched, i.e. the reservation point in time for the deadline permanent circuit connection FV must be selected all the earlier the greater the scope of the required switching-oriented resources VR for the deadline permanent circuit connection FV. It is also assumed for the reservation sequence of FIG. 1A that only switching-oriented resources VR of switched connections W without call duration indication that become free are reserved for the following, deadline permanent circuit connection FV. The freeing-up of the switching-oriented resources VR of switched connections W without call duration indication and the reservation points in time for the switching-oriented resources becoming free are indicated by the step-shaped course of the reservation curve. The vertically hatched area shows the reserved, switching-oriented resources VR for the deadline permanent circuit connection FV that, for example, are no longer available for switched connections.

FIG. 1B shows the reservation sequence for an identically deadline permanent circuit connection FV, taking the method of the present invention into consideration. It is thereby assumed that a considerable plurality of switched connections having call duration particulars are switched by the communication system. Based on this assumption, a second reservation point in time trz2 can be defined. This second reservation point in time trz2 lies considerably closer to the deadline T for the following, deadline permanent circuit connection FV. This means that a control means of the communication system is burdened considerably later and to a far lesser extent by the reservation procedure. Further, the vertically hatched area shown in FIG. 1B shows the switching-oriented resources VR that are to be reserved before the deadline T of the deadline permanent circuit connection FV. A comparison of the two vertically hatched areas in FIG. 1A and FIG. 1B shows that switching-oriented resources for a following, deadline permanent circuit connection FV need only be reserved significantly later and for a shorter chronological duration due to the method of the invention. These switching-oriented resources VR that continue to be usable for switched connections W having indicated call durations considerably enhance the call handling capacity of, for example, a base terminal of a broadband, integrated services digital network.

FIG. 1C shows the reservation sequence for a permanent circuit connection FV that is deadline according to FIG. 1A or, respectively, 1B, whereby it is assumed here that the sum of the switching-oriented resources VR of switched connections W that have call duration indications and become free is not adequate for the following, deadline permanent circuit connection FV. Under this assumption, the reservation sequence is started beginning at the first reservation point in time trz1 according to FIG. 1A. The sum of the switching-oriented resources VR of the switched connections M whose indicated call durations end before the deadline T for the deadline permanent circuit connection FV is thereby calculated and the switching-oriented resources VR additionally required are reserved by switching-oriented resources VR of switched connections W without call duration indications that become free. In FIG. 1C, let this be shown, for example, by the first two steps. The further course of the reservation sequence is determined by the switching-oriented resources VR of the selected switched connections W having call duration indications that become free. By comparing the vertically hatched areas in FIG. 1C and FIG. 1A, it becomes clear that a still considerable scope of switching-oriented resources VR is reserved and is also available for switched connections W even given a combination of the traditional reservation method with the method of the present invention. Thus, the switching-oriented call handling capacity of a communication system is considerably enhanced.

Figure 3:
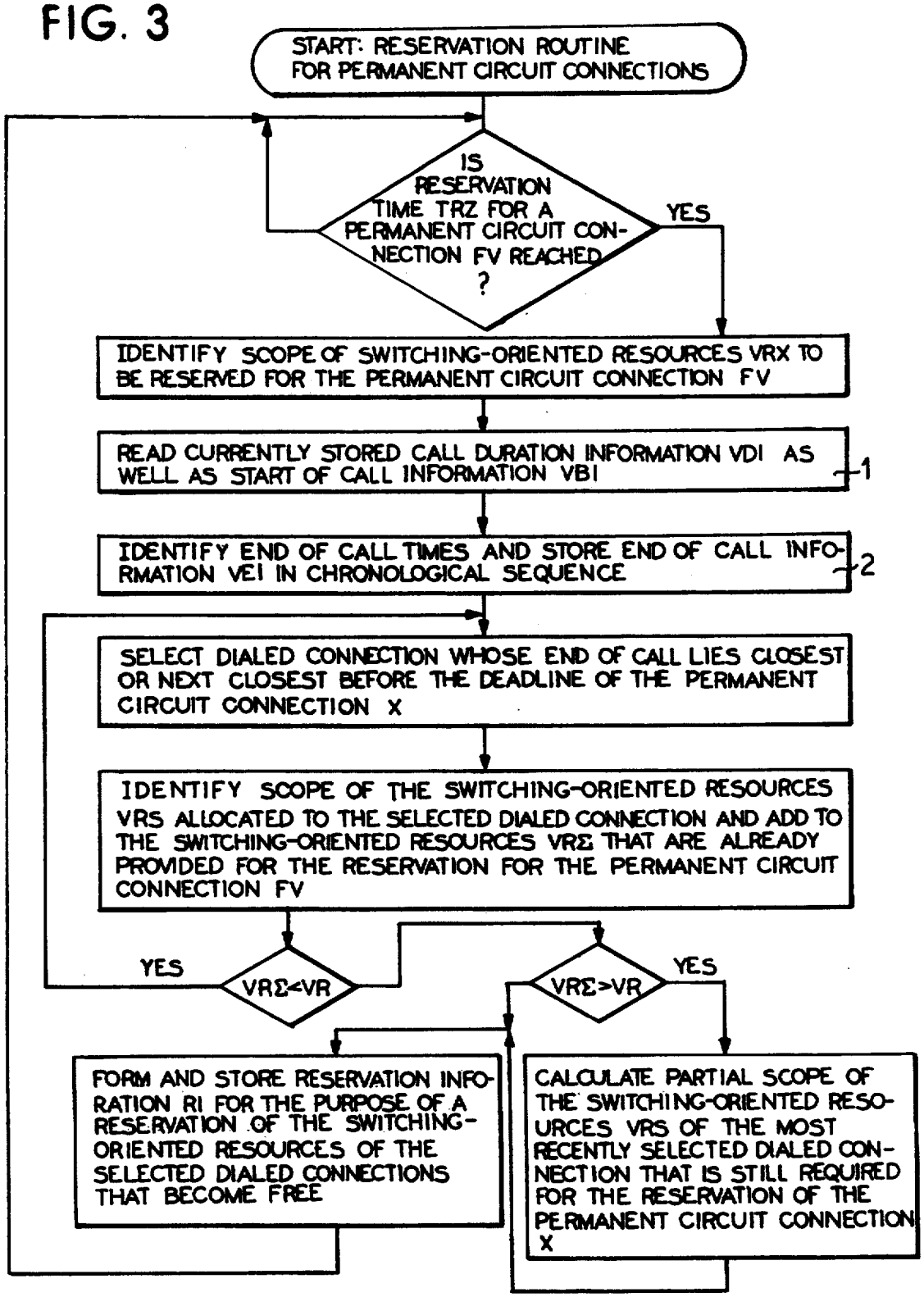

Using two flowcharts together with the flowchart shown in FIG. 3, FIGS. 2A and 2B show two advantageous, program-oriented realizations. Let it be assumed for the two exemplary embodiments that the call duration information vi are communicated within the framework of a signalling between the communication system and the communication terminal equipment. For example, the signalling procedure corresponds to CCITT Recommendation Q.93B (B-ISDN access signalling), whereby, for example, the information element is expanded by a region for the communication of a call duration information vdi.

The difference between the two possible realizations is that call start information vbi is additionally formed after the through-connection of the respective switched connection W in the first version (FIG. 2A) and that is intermediately stored together with the call duration information vdi, and an end of call time is calculated after the through-connection of the respective switched connection W immediately after the acquisition of the starting time of the switched connection in the second version (FIG. 2B) and is intermediately stored. A realization according to the first version is to be preferably provided for communication systems wherein few permanent circuit connections are to be switched, since the additional outlay during the switching of a switched connection remains limited to a minimum. Version two of the realization is preferably suitable for communication systems wherein permanent circuit connections are to be frequently switched, since an end of call information vei is already formed during the signalling procedure and intermediately stored and, thus, the reservation sequence is considerably shortened.

A flowchart in FIG. 3 shows the reservation routine for permanent circuit connections FV according to the realized version of FIG. 2A. A flowchart derives in that the sequence steps identified by numerals 1 and 2 are eliminated.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for allocating switching-oriented resources in a communication system wherein deadline permanent circuit connections and switched connections are switched with switching resources between communication terminal equipment connected to the communication system, comprising the steps of:

forming call duration information in the communication terminal equipment of the communication system given switched connections whose call durations are determinable and communicating the call duration information to the communication system within a framework of a call setup;

selecting switched connections whose call durations end closest to a first switching deadline before following switching deadlines of the deadline permanent circuit connections in the communication system beginning with reservation points in time for deadline permanent circuit connections dependent on scopes of the switching-oriented resources provided for the deadline permanent circuit connections and on a traffic load of the communication system, and selecting switched connections therefrom dependent on scopes of switching-oriented resources allocated to the selected switched connections and on a scope of switching-oriented resources required for the permanent circuit connection; and reserving switching-oriented resources of the selected switched connections that become free after an end of a call for the respectively provided, deadline permanent circuit connections.

2. The method according to claim 1, wherein the method further comprises steps wherein switching-oriented resources of switched connections without determinable call durations that become free are reserved beginning with further reservation points in time that are provided for reservation of switching-oriented resources of switched connections without determinable call durations that become free, being reserved dependent on a plurality of switched connections whose determined call durations end closest to the first switching deadline before the following switching deadlines of deadline permanent circuit connections.

3. The method according to claim 2, wherein the method further comprises steps wherein the reservation point in time for reserving switching-oriented resources of switched connections with or without determined call durations are determinable dependent on a plurality of switched connections having determined call durations and/or on a sum of the switching-oriented resources of these switched connections.

4. The method according to claim 1, wherein the method further comprises steps wherein the communicated call duration information is intermediately stored in the communication system, and after a through-connection of the switched connections, their start of call times are calculated and a start of call information is formed and is also stored with the call duration information.

5. The method according to claim 4, wherein the method further comprises steps wherein beginning with a reservation point in time provided for a respective permanent circuit connection, call duration information, as well as, start of call information are read, a respective end of call time is identified and a corresponding end of call information is formed and is stored in chronological sequence; with the stored end of call information, the switched connection lying closest before a deadline of the deadline permanent circuit connection and the scope of the switching-oriented resources allocated thereto are identified; given an inadequate scope of the switching-oriented resources of the selected switched connection for the deadline permanent circuit connection to be respectively switched, a following switched connection lying next closest to the switching deadline is respectively selected until a sum of the switching-oriented resources of the selected switched connections corresponds to a required scope of the switching-oriented resources of the deadline permanent circuit connection; and reservation information is formed and stored for reserving switching-oriented resources of the selected switched connections that become free.

6. The method according to claim 1, wherein the method further comprises steps wherein the communicated call duration information is intermediately stored in the communication system, and after a through-connection of the switched connections, their start of call times are identified and an end of call time is identified with the stored call duration information, a corresponding end of call information is formed and is stored instead of the call duration information.

7. The method according to claim 6, wherein the method further comprises steps wherein a switched connection lying closest before a switching deadline of a respective, deadline permanent circuit connection is selected and a scope of the switching-oriented resources allocated thereto is identified beginning with a reservation point in time provided for the respective, deadline permanent circuit connection and using the stored end of call information; given an inadequate scope of the switching-oriented resources of the selected switched connection for the deadline permanent circuit connection to be respectively switched, a following switched connection lying closest to the switching deadline is respectively selected until a sum of the switching-oriented resources of the selected connections respectively corresponds to a required scope of the switching-oriented resources of the deadline permanent circuit connection; and reservation information is formed and stored for reserving the switching-oriented resources of the selected switched connections that become free.

8. The method according to claim 7, wherein the method further comprises steps wherein the call duration information is communicated to the communication system from communication terminal equipment in a duration information field in a call setup message of the broadband, integrated services digital network.

9. The method according to claim 1, wherein the method further comprises steps wherein the switching-oriented resources represent a switching capacity of a communication system and/or respectively represent a communication capacity of a base terminal of a broadband, integrated services digital network.

10. A method for allocating switching-oriented resources in a communication system wherein deadline permanent circuit connections and switched connections are switched with switching resources between communication terminal equipment connected to the communication system, comprising the steps of:

forming call duration information in the communication terminal equipment of the communication system given switched connections whose call durations are determinable and communicating the call duration information to the communication system within a framework of a call setup;

selecting switched connections whose call durations end closest to a first switching deadline before following switching deadlines of the deadline permanent circuit connections in the communication system beginning with reservation points in time for deadline permanent circuit connections dependent on scopes of the switching-oriented resources provided for the deadline permanent circuit connections and on a traffic load of the communication system, and selecting switched connections therefrom dependent on scopes of switching-oriented resources allocated to the selected switched connections and on a scope of switching-oriented resources required for the permanent circuit connection;

reserving switching-oriented resources of the selected switched connections that become free after an end of a call for the respectively provided, deadline permanent circuit connections; and reserving switching-oriented resources of switched connections without determinable call durations, that become free, beginning with further reservation points in time that are provided for reservation of switching-oriented resources of switched connections without determinable call durations that become free, being reserved dependent on a plurality of switched connections whose determined call durations end closest to the first switching deadline before the following switching deadlines of deadline permanent circuit connections, the reservation point in time for reserving switching-oriented resources of switched connections with or without determined call durations being determinable dependent on a plurality of switched connections having determined call durations and/or on a sum of the switching-oriented resources of these switched connections.

11. The method according to claim 10, wherein the method further comprises steps wherein the communicated call duration information is intermediately stored in the communication system, and after a through-connection of the switched connections, their start of call times are calculated and a start of call information is formed and is also stored with the call duration information.

12. The method according to claim 11, wherein the method further comprises steps wherein beginning with a reservation point in time provided for a respective permanent circuit connection, call duration information, as well as, start of call information are read, a respective end of call time is identified and a corresponding end of call information is formed and is stored in chronological sequence; with the stored end of call information, the switched connection lying closest before a deadline of the deadline permanent circuit connection and the scope of the switching-oriented resources allocated thereto are identified; given an inadequate scope of the switching-oriented resources of the selected switched connection for the deadline permanent circuit connection to be respectively switched, a following switched connection lying next closest to the switching deadline is respectively selected until a sum of the switching-oriented resources of the selected switched connections corresponds to a required scope of the switching-oriented resources of the deadline permanent circuit connection; and reservation information is formed and stored for reserving switching-oriented resources of the selected switched connections that become free.

13. The method according to claim 10, wherein the method further comprises steps wherein the communicated call duration information is intermediately stored in the communication system, and after a through-connection of the switched connections, their start of call times are identified and an end of call time is identified with the stored call duration information, a corresponding end of call information is formed and is stored instead of the call duration information.

14. The method according to claim 13, wherein the method further comprises steps wherein a switched connection lying closest before a switching deadline of a respective, deadline permanent circuit connection is selected and a scope of the switching-oriented resources allocated thereto is identified beginning with a reservation point in time provided for the respective, deadline permanent circuit connection and using the stored end of call information; given an inadequate scope of the switching-oriented resources of the selected switched connection for the deadline permanent circuit connection to be respectively switched, a following switched connection lying closest to the switching deadline is respectively selected until a sum of the switching-oriented resources of the selected connections respectively corresponds to a required scope of the switching-oriented resources of the deadline permanent circuit connection; and reservation information is formed and stored for reserving the switching-oriented resources of the selected switched connections that become free.

15. The method according to claim 10, wherein the method further comprises steps wherein the switching-oriented resources represent a switching capacity of a communication system and/or respectively represent a communication capacity of a base terminal of a broadband, integrated services digital network; wherein the call duration information is communicated to the communication system from communication terminal equipment in a duration information field in a call setup message of the broadband, integrated services digital network.

16. A method for allocating switching-oriented resources in a communication system wherein deadline permanent circuit connections and switched connections are switched with switching resources between communication terminal equipment connected to the communication system, comprising the steps of:

providing switching-oriented resources that represent communication capacity of a base terminal of a broadband, integrated services digital network;

forming call duration information in the communication terminal equipment of the communication system given switched connections whose call durations are determinable and communicating the call duration information to the communication system in a duration information field in a call setup message of the broadband, integrated services digital network;

selecting switched connections whose call durations end closest to a first switching deadline before following switching deadlines of the deadline permanent circuit connections in the communication system beginning with reservation points in time for deadline permanent circuit connections dependent on scopes of the switching-oriented resources provided for the deadline permanent circuit connections and on a traffic load of the communication system, and selecting switched connections therefrom dependent on scopes of switching-oriented resources allocated to the selected switched connections and on a scope of switching-oriented resources required for the permanent circuit connection; and reserving switching-oriented resources of the selected switched connections that become free after an end of a call for the respectively provided, deadline permanent circuit connections.

17. The method according to claim 16, wherein the method further comprises steps wherein the communicated call duration information is intermediately stored in the communication system, and after a through-connection of the switched connections, their start of call times are calculated and a start of call information is formed and is also stored with the call duration information.

18. The method according to claim 17, wherein the method further comprises steps wherein beginning with a reservation point in time provided for a respective permanent circuit connection, call duration information, as well as, start of call information are read, a respective end of call time is identified and a corresponding end of call information is formed and is stored in chronological sequence; with the stored end of call information, the switched connection lying closest before a deadline of the deadline permanent circuit connection and the scope of the switching-oriented resources allocated thereto are identified; given an inadequate scope of the switching-oriented resources of the selected switched connection for the deadline permanent circuit connection to be respectively switched, a following switched connection lying next closest to the switching deadline is respectively selected until a sum of the switching-oriented resources of the selected switched connections corresponds to a required scope of the switching-oriented resources of the deadline permanent circuit connection; and reservation information is formed and stored for reserving switching-oriented resources of the selected switched connections that become free.

19. The method according to claim 16, wherein the method further comprises steps wherein the communicated call duration information is intermediately stored in the communication system, and after a through-connection of the switched connections, their start of call times are identified and an end of call time is identified with the stored call duration information, a corresponding end of call information is formed and is stored instead of the call duration information.

20. The method according to claim 19, wherein the method further comprises steps wherein a switched connection lying closest before a switching deadline of a respective, deadline permanent circuit connection is selected and a scope of the switching-oriented resources allocated thereto is identified beginning with a reservation point in time provided for the respective, deadline permanent circuit connection and using the stored end of call information; given an inadequate scope of the switching-oriented resources of the selected switched connection for the deadline permanent circuit connection to be respectively switched, a following switched connection lying closest to the switching deadline is respectively selected until a sum of the switching-oriented resources of the selected connections respectively corresponds to a required scope of the switching-oriented resources of the deadline permanent circuit connection; and reservation information is formed and stored for reserving the switching-oriented resources of the selected switched connections that become free.

* * * * *